(Model.)
R. E. NEUBER.
LOOM TEMPLE.
No. 263,946. Patented Sept. 5, 1882.
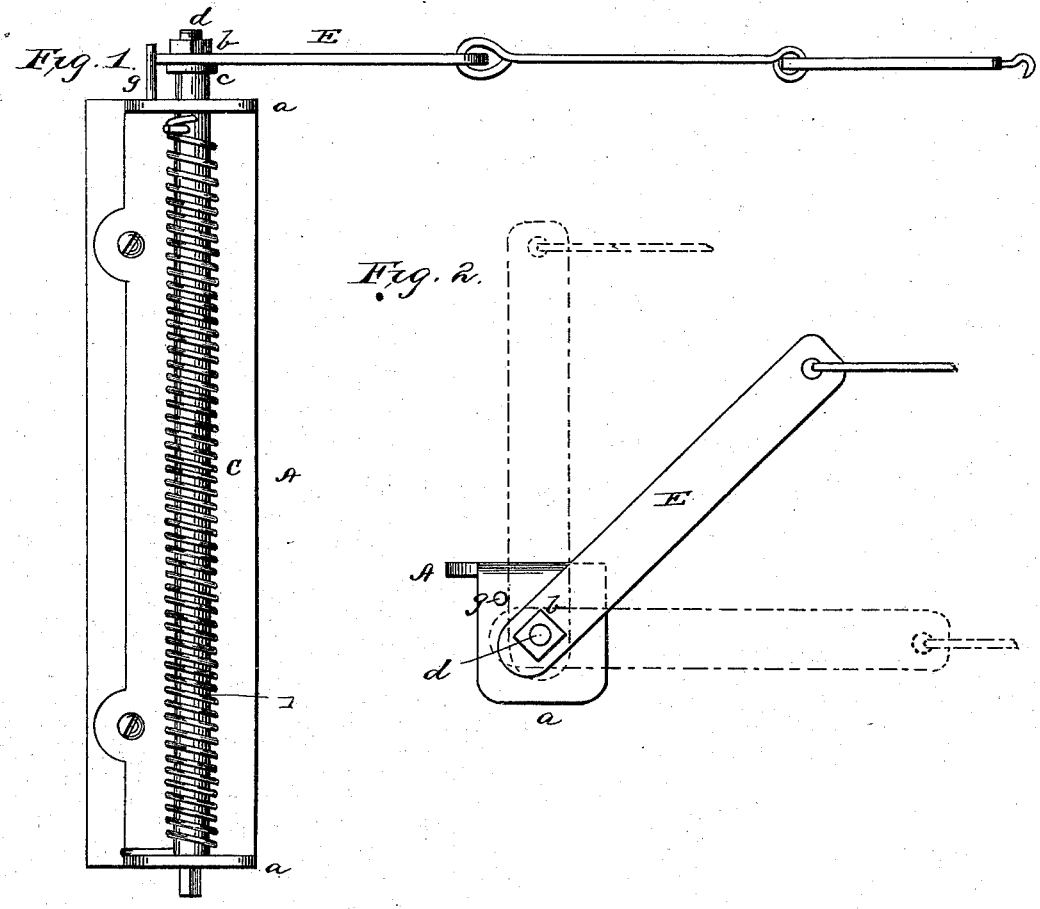
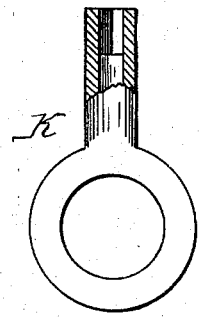
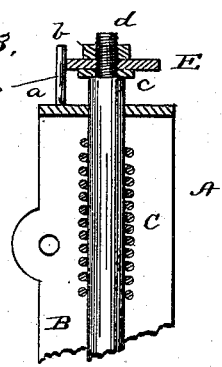
Witnesses.
Edwin L. Yewell
J. J. McCarthy
Inventor,
Robert E. Neuber,
by C. M. Alexander,
Attorney.

UNITED STATES PATENT OFFICE.

ROBERT E. NEUBER, OF PITTSFIELD, MASSACHUSETTS.

LOOM-TEMPLE.

SPECIFICATION forming part of Letters Patent No. 263,946, dated September 5, 1882.

Application filed December 14, 1881. (Model.)

*To all whom it may concern:*

Be it known that I, ROBERT E. NEUBER, of Pittsfield, in the county of Berkshire, and in the State of Massachusetts, have invented certain new and useful Improvements in Loom-Temples; and I do hereby declare that the following is a full, clear, and exact description thereof, reference being had to the accompanying drawings, and to the letters of reference marked thereon, making a part of this specification.

This invention relates to temples wherein springs are employed to keep the cloth stretched laterally, and the temples are secured to the breast-beam of the loom.

My invention consists in the combination of a tension-spring, and a spindle bearing an arm, with a bearing-plate by which the working parts are secured to the breast-beam of a loom, a stop-pin on the upper end of said bearing-plate, a link, and a claw attached to the free end of the arm, as will be fully explained hereinafter.

In the annexed drawings, Figure 1 is a front elevation of my improved loom-temple. Fig. 2 is a top view with the claw and part of the link broken away. Fig. 3 is a detail partly in section of the spindle, its bearing-plate and spring, and the arm. Fig. 4 is a view partly in section of the key for turning spindle B.

A designates a bearing plate, which is to be rigidly secured to the breast-beam of a loom, and which has ears $a$ $a$ formed on its ends, in which is free to turn a spindle, B. The lower end of this spindle B is made square to receive a key, K, (shown in Fig. 4,) by means of which the spindle can be turned when it is desired to adjust the tension of the spring C.

The spring C is coiled around the spindle and secured to it at one end. The lower end of spring C is attached to the bearing-plate A in any suitable manner. The upper end of spindle B has a male screw, $d$, formed on it, on which is applied a washer, $c$, an arm E, and a clamping-nut, $b$. By screwing the nut $b$ down tightly on the end of arm E, the lower end of the spindle B being held by the key K, the said arm and spindle can be rigidly secured together. By loosening the nut and turning the spindle by means of the key, and then tightening the nut again, any required degree of tension can be given to the spring, which will be transmitted to the arm E, operating to move it in the direction of a stop-pin, $g$, fixed into the top of the bearing-plate A. The pin $g$ is a stop for the arm E, to prevent the spring from uncoiling when the temple is not connected to the cloth which is being woven in the loom.

G designates a claw, which is preferably made of sole-leather, having sharp hooks inserted into it for grabbing and holding the edge of the cloth. This claw is loosely connected by a link, J, to the free end of the arm E.

What I claim as my invention is—

The combination of the spindle B and plate A with the coiled spring C, connected to the spindle and plate, the arm E, the stop-pin $g$, and the claw attached to the arm by a link, substantially as and for the purposes described.

In testimony whereof I affix my signature, in presence of two witnesses, this 6th day of December, 1881.

ROBERT E. NEUBER.

Witnesses:
H. W. POWERS,
R. B. BARDWELL.